(12) United States Patent
Ozaki (10) Patent No.: US 6,935,790 B2
(45) Date of Patent: Aug. 30, 2005

(54) OPTICAL CONNECTOR HAVING A HOUSING WITH A PLATE-LIKE SPRING LOCKING AN OPTICAL FIBER FERRULE THEREIN

(75) Inventor: Masahito Ozaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 10 days.

(21) Appl. No.: 10/653,910

(22) Filed: Sep. 4, 2003

(65) Prior Publication Data

US 2004/0076389 A1 Apr. 22, 2004

(30) Foreign Application Priority Data

Oct. 16, 2002 (JP) ........................................ 2002-301750

(51) Int. Cl.[7] .............................. G02B 6/36; G02B 6/00
(52) U.S. Cl. ............................ 385/78; 385/136; 385/58
(58) Field of Search ........................... 385/78, 136, 58, 385/60, 70, 72, 75

(56) References Cited

U.S. PATENT DOCUMENTS

| | | | | |
|---|---|---|---|---|
| 4,986,625 A | * | 1/1991 | Yamada et al. ............... | 385/55 |
| 5,214,730 A | * | 5/1993 | Nagasawa et al. ............. | 385/59 |
| 6,174,091 B1 | | 1/2001 | Herrmann ...................... | 385/81 |
| 6,296,399 B1 | | 10/2001 | Halbach et al. ................ | 385/81 |
| 6,382,839 B1 | | 5/2002 | Eguchi et al. ................. | 385/56 |
| 6,457,878 B2 | * | 10/2002 | Edwards et al. .............. | 385/96 |
| 2002/0106162 A1 | * | 8/2002 | Loder et al. ................... | 385/53 |

* cited by examiner

Primary Examiner—Chandrika Prasad
(74) Attorney, Agent, or Firm—Armstrong, Kratz, Quintos, Hanson & Brooks, LLP (57) ABSTRACT

For preventing reduction of transmitting efficiency of signal light, an optical connector 1 has a ferrule 4 joined with an end of an optical fiber cable 7, a housing and a plate-like spring 6. The ferrule 4 includes a cylindrical portion 11 and the first flange 12 disposed at central portion 11a of the cylindrical portion 11. The plate-like spring 6 received in the housing 5 has a first straight portion 21 abutting on the flange 12, a second straight portion 22 abutting on an inner surface of the housing 5, and connecting portions 23 connecting the straight portions 21, 22. The first straight portion 21 and the second straight portion 22 intersect a center axis P perpendicularly.

4 Claims, 7 Drawing Sheets

OPTICAL CONNECTOR HAVING A HOUSING WITH A PLATE-LIKE SPRING LOCKING AN OPTICAL FIBER FERRULE THEREIN

BACKGROUND OF THE INVENTION

1. Field of the Invention

This invention relates to an optical connector receiving an end of an optical fiber for transmitting signal light.

2. Description of the Related Art

Generally, a wire harness, a set of electric wires, is used for connecting an auxiliary device in a car. Increasing number of auxiliary devices and corresponding circuits recently, electromagnetic noise generated by transmitting electric signals trends to increase. For reducing the noise, an optical fiber communication system which uses an optical fiber as a part of the wire harness to transmit signals to auxiliary devices is proposed.

Figure 13:
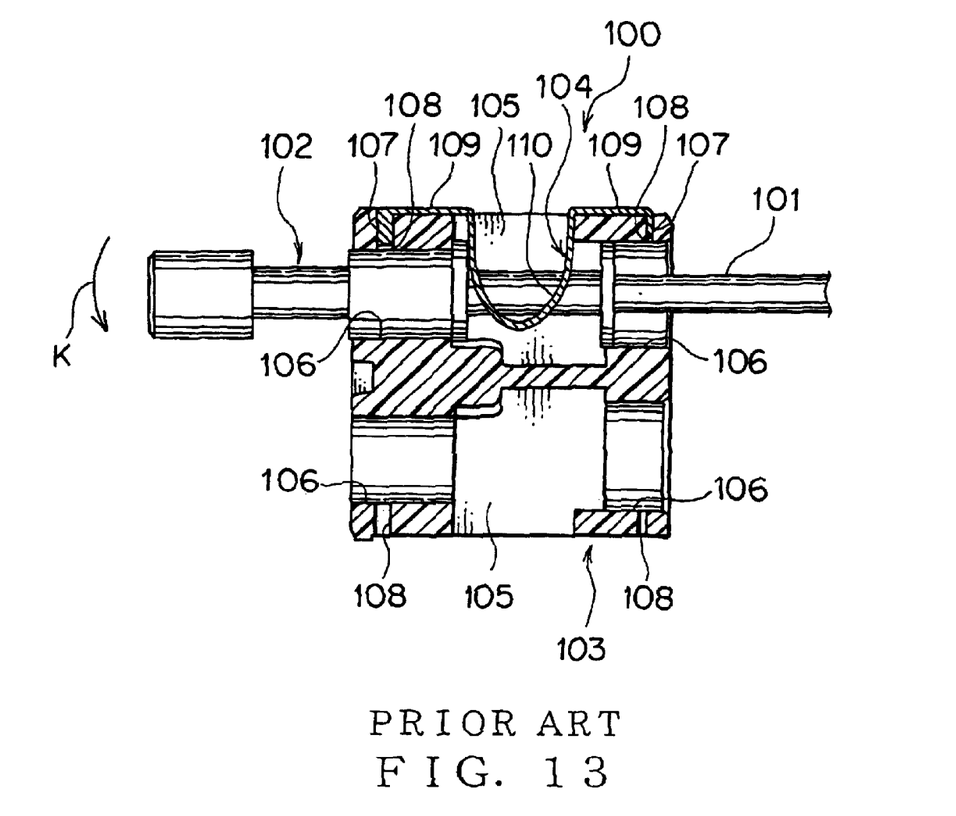
FIG. 13 is a sectional view of a usual optical connector.

The optical fiber communication system uses various optical connectors to transmit signal light converted from electric signal and receive signal light converted to electric signal. FIG. 13 shows one example.

An optical connector 100 shown in FIG. 13 includes a ferrule 102 mounted on an end of an optical fiber cable 101, a housing 103 and a plate-like spring 104 as a pushing means. The ferrule 102 is made of metal and formed cylindrically. The ferrule 102 is coaxial with the optical fiber cable 101.

The housing 103 is made of synthetic resin and formed into box-shape. The housing 103 is provided with an opening portion 105. The opening portion 105 passes through an outer wall of the housing 103. The opening portion 105 receives abase end 102a, close to the optical fiber cable 101, of the ferrule 102 and the plate-like spring 104.

The housing 103 is provided on the outer wall with a plurality of through holes 106 for passing the ferrule 102 therethrough and a hole 108 for locking a later-described locking hook 107 therein. Two though holes 106 are provided for one ferrule 102. The locking hook 107 is inserted into the hole 108. The housing 103 supports the ferrule 102 so as to insert the ferrule 102 and position the base end 102a in the opening portion 105.

The plate-like spring 104 has integrally a pair of mount portions 109 and an elastically deformable portion 110. The pair of mount portions 109 is formed into flat and disposed with a distance therebetween. The mount portions 109 are attached on the outer wall of the housing 103. The mount portion 109 is formed integrally with the locking hook 107 as shown in FIG. 13. The locking hook 107 is inserted into the hole 108 to be locked in the hole 108, i.e. the housing 103.

The elastically deformable portion 110 connects the pair of mount portions 109. The elastically deformable portion 110 is formed curvedly into U-shape. When the locking hook 107 of the mount portion 109 is locked with the hole 108, the elastically deformable portion 110 is received in the opening portion 105. The elastically deformable portion 110 abuts on the ferrule 102 so as to push the ferrule 102 along a center axis of the optical fiber cable 101. The elastically deformable portion 110 is provided with a cutout for passing the ferrule 102 therethrough.

Inserting the ferrule 102 in the through hole 106 of the housing 103, attaching the mount portions 109 on the outer wall of the housing 103, pressing the locking hooks 107 in the holes 108, inserting the ferrule 102 into the cutout of the elastically deformable portion 110, and inserting the elastically deformable portion 110 into the opening portion 105, the elastically deformable portion 110 pushes the ferrule 102 along a center axis of the optical fiber cable 101. Thus, the optical connector 100 is assembled. The optical connector 100, assembled as mentioned above, is connected with an electronic device or a mating optical connector to transmit required signal light.

Objects to be Solved

In the aforesaid usual optical connector 100, the curved elastically deformable portion 110 pushes the ferrule 102. When the optical fiber cable 101 is pulled against a pushing force of the elastically deformable portion 110, the ferrule 102 may be rotated along an arrow K in FIG. 13 around the lengthwise center portion of the ferrule because of curvature of the elastically deformable portion 110. Therefore, if a gap between the housing 103 and the ferrule 102 is large, the ferrule 102 may be tilted. When the ferrule is tilted, transmitting efficiency of signal light at a connecting point between the optical connector 100 and the electronic device or the mating optical connector may be reduced, unexpectedly.

In the aforesaid optical connector 100, the plate-like spring 104 is mounted on the housing 103 by inserting the locking hook 107 into the hole 108. The locking hook 107 is pushed into the hole 108 along an extending direction of the locking hook 107. Therefore, the mount portion 109, i.e. the plate-like spring 104, may be slipped off from the housing 103 when the locking hook 107 is gone out of the hole 108. Additionally, the plate-like spring 104 is hardy mounted on the housing because the locking hook 107 is pressed into the hole 108.

To overcome the above drawback of prior art, the first object of this invention is to provide an optical connector which can prevent reduction of transmitting efficiency of signal light. The second object is to provide an optical connector which can prevent a plate-like spring for pushing a ferrule from unexpected slipping out and can mount the plate-like spring easily on a housing.

SUMMARY OF THE INVENTION

How to Attain the Object

In order to attain the first object, an optical connector according to the present invention having a ferrule to be attached to an end of an optical fiber, a housing formed into box-shape for receiving at least a part of said ferrule, and a plate-like spring received in said housing and pushing said ferrule along a center axis of said optical fiber, said ferrule includes a cylindrical portion for receiving said optical fiber and a projecting portion projecting from an outer surface of said cylindrical portion, said projecting portion being positioned in said housing and supported freely to move along the center axis of said optical fiber by said housing, and said plate-like spring includes a first flat straight portion, a second flat straight portion parallel to the first straight portion and a connecting portion connecting the first straight portion and the second straight portion and being elastically deformable so as to allow the first straight portion and the second straight portion to move close to and apart from each other, and the first straight portion abuts on the projecting portion of the ferrule and the second straight portion abuts on an inner surface of the housing, and the plate-like spring is received in the housing to place both a surface of the first straight portion and a surface of the second straight portion to be perpendicular to the center axis and pushes the ferrule along the center axis.

According to the above-mentioned structure, the surface of the first straight portion abutting on the projecting portion of the ferrule and the second straight portion abutting on the inner surface of the housing intersect perpendicularly to the center axis. Thereby, when the optical fiber cable is pulled along the center axis of the optical fiber against the pushing force of the plate-like spring, the ferrule is not tilted.

In order to attain the second object, the optical connector according to the present invention having a ferrule to be attached to an end of an optical fiber, a housing formed into box-shape with an opening portion for receiving at least a part of said ferrule, and a plate-like spring received in said opening portion and pushing said ferrule along a center axis of said optical fiber, has a pair of ferrules, and said plate-like spring includes a pair of lock portions locking respectively said ferrules and a connecting portion connecting said pair of locking portions with each other and being elastically deformable so as to allow the pair of locking portions to move close to and apart from each other, and said each lock portion includes a body portion abutting on said ferrule for pushing said ferrule, a first extending portion extending from an inside edge of said body portion of one of said pair of locking portions being parallel to the first extending portion of an other of said pair of locking portions and a second extending portion extending from the first extending portion to be apart from each other in a direction perpendicular to the first extending portion, said lock portion locking said ferrule so as to position said ferrule in inner sides of said body portion, the first extending portion and the second extending portion, and the plate-like spring is inserted into the opening portion to elastically deform the connecting portion in a direction of bringing said pair of lock portions near to each other in a condition of that at least a part of the ferrule is received in the opening portion, and said lock portions lock said ferrules by that the lock portions are separated from each other by elastic restoring force of the second connecting portion.

According to the above-mentioned structure, when the locking portion locks the ferrule, the ferrule is surrounded with the body, the first extending portion and the second extending portion. The extending direction of the first extending portion and the extending direction of the second extending direction intersect. When the pair of locking portions lock the ferrule, it is maintained that the ferrule is surrounded with the body, the first extending portion and the second extending portion by the elastic restoring force of the connecting portion. Thereby, the plate-like spring is prevented from stripping out unexpectedly from the housing.

Inserting the plate-like spring into the opening portion to bring the pair of lock portions near to each other, the pair of lock portions lock said ferrules by the elastic restoring force of the connecting portion. Therefore, by inserting the plate-like spring into the opening portion to bring the pair of lock portions near to each other, the plate-like spring can be mounted on the housing. Thus, the plate-like spring can be mounted easily on the housing.

In order to attain the first and second objects, the optical connector according to the present invention, includes a pair of said ferrules, and said housing has an opening portion for receiving at least a part of said ferrule, said opening portion receiving said plate-like spring therein, and a pair of the first straight portions, a pair of the second straight portions and a pair of connecting portions are provided, and said first straight portion includes a body portion abutting on said ferrule for pushing said ferrule, a first extending portion extending from an inside edge of said body portion of one of the first straight portions being parallel to the first extending portion of the other body portion and a second extending portion extending from each of the first extending portions to be apart from the other in a direction perpendicular to the first extending portion, said first extending portion locking said ferrule so as to position said ferrule in inner sides of said body portion, the first extending portion and the second extending portion, and said second straight portions are connected with each other to be elastically deformable so as to allow said pair of first straight portions to move close to and apart from each other, and the plate-like spring is inserted into an opening portion to elastically deform the connecting portions in a direction of bringing said pair of first straight portions near to each other in a condition of that at least a part of the ferrule is received in the opening portion, and said first straight portions lock said ferrules by that the pair of first straight portions are separated from each other by elastic restoring force of the connecting portion.

According to the above-mentioned structure, the surface of the first straight portion abutting on the projecting portion of the ferrule and the surface of the second straight portion abutting on the inner surface of the housing intersect perpendicularly the center axis. Thereby, when the optical fiber cable is pulled along the center axis of the optical fiber against the pushing force of the plate-like spring, the ferrule is not tilted.

When the first straight portion locks the ferrule, the ferrule is surrounded with the body, the first extending portion and the second extending portion. The extending direction of the first extending portion and the extending direction of the second extending direction intersect. When the pair of the first straight portion locks the ferrule, it is maintained that the ferrule is surrounded with the body, the first extending portion and the second extending portion by the elastic restoring force of the connecting portion. Thereby, the plate-like spring is prevented from stripping out unexpectedly from the housing.

Inserting the plate-like spring into the opening portion to bring the pair of first straight portions near to each other, the pair of first straight portions lock said ferrules by the elastic restoring force of the connecting portion. Therefore, by inserting the plate-like spring into the opening portion to bring the pair of first straight portions near to each other, the plate-like spring can be mounted on the housing. Thus, the plate-like spring can be mounted easily on the housing.

The optical connector according to the invention is more specified, in the optical connector mentioned above, by that said connecting portion is connected with one of said first straight portion and said second straight portion and provided with a pair of straight portions along a direction perpendicular to the first and second straight portions, and said opening portion is formed into rectangular along outline of said first straight portion, said second straight portion and said straight portion.

According to the above-mentioned structure, the opening portion is formed into rectangular along outline of said first straight portion, said second straight portion and said straight portion of the connecting portion. Thereby, when the plate-like spring is inserted, the first and second straight portions and the straight portion of the connecting portion contact with the inner surfaces of the housing to guide the plate-like spring to an insert direction.

The above and other objects and features of this invention will become more apparent from the following description taken in conjunction with the accompanying drawings.

DESCRIPTION OF THE PREFERRED EMBODIMENT

An embodiment of an optical connector according to the present invention will now be described with reference to FIG. 1–12. An optical connector I according to the present invention is connected with an electronic device installed in a car or a mating optical connector to transmit signal light. The optical connector 1, as shown in FIG. 1–5, has a pair of ferrules 4, a housing 5 and a plate-like spring 6. The ferrules 4 are respectively joined with an optical fiber cable 7. The optical fiber cable 7 structured by an optical fiber 8 of a light guide material, the first sheath 9 and the second sheath 10. The optical fiber 8 is a usual multi-mode plastic optical fiber disposed coaxially with a core and a cladding having a different refractive index from each other.

The first and second sheaths 9, 10 are made of respective insulating synthetic materials. The first sheath 9 covers the optical fiber 8 for protection. The second sheath 10 covers the first sheath 9 on the optical fiber 8 for protection. The second sheath 10 and the first sheath 9 of the optical fiber cable 7 are peeled at the both ends of the optical fiber cable 7 to expose the first sheath 9 and the optical fiber 8 in order toward the each end.

The ferrule 4 is joined with the end of the optical fiber cable 7, i.e. the optical fiber 8. The ferrule 4 is made of a metal such as a brass. The ferrule 4 is formed with a cylindrical portion 11, a first flange 12 at a central portion 11a of lengthwise of the cylindrical portion 11 and a second flange 13 at one end 11b of the cylindrical portion 11.

The first flange 12 is formed cylindrically so as to project radially from an outer surface of the cylindrical portion 11. The first flange 12 is provided around the cylindrical portion 11. The first flange 12 corresponds to the projecting portion mentioned above.

The second flange 13 is formed cylindrically so as to project radially from an outer surface of the cylindrical portion 11. The second flange 13 is provided around the cylindrical portion 11. When the ferrule 4 is joined with the optical fiber cable 7, the second flange 13 is located near the optical fiber cable 7. The one end 11b is defined as a base end of the cylindrical portion 11, near side to the optical fiber cable 7.

The ferrule 4 has a third flange 14. The third flange 14 is disposed between the first flange 12 and the second flange 13. The third flange 14 is formed cylindrically so as to project radially from an outer surface of the cylindrical portion 11. The third flange 14 is provided around the cylindrical portion 11. An outer diameter of the third flange 14 is smaller than the both outer diameters of the first flange 12 and the second flange 13. The third flange 14, as later described, abuts on the second straight portion 22 to prevent the plate-like spring 6 from deforming over limit of elasticity when the optical fiber cable 7 is pulled against the pushing force of the plate-like spring 6.

The aforesaid cylindrical portion 11, the first, second and third flanges 12, 13 and 14 are disposed coaxially to each other. The aforesaid cylindrical portion 11, the first, second and third flanges 12, 13 and 14 are coaxial to the optical fiber cable, i.e. the optical fiber 8, when the ferrule 4 is joined with the end of the optical fiber cable 7.

The ferrule 4 formed as mentioned above receives the optical fiber 8 of the optical fiber cable 7 in the cylindrical portion 11. Thus, the ferrule 4 is attached on the end of the optical fiber 8. Each ferrule 4 is joined respectively with ends of the optical fiber cable 7.

The housing 5 is made of synthetic resin. The housing 5 is formed into box-shape with a plurality of outer walls 15 continuous to each other. The housing 5 is formed parallelepiped. The housing 5 has a pair of opening portions 16 and a plurality of through holes 17. The opening portions 16 open at one outer wall 15a of a plurality of outer walls 15, located at the top in FIG. 1, 2 and at the other outer wall 15b located at bottom in FIG. 4. The opening portion 16 communicates between outside and inside of the housing 5. The shape in a plan view of opening portion 16 is rectangular along an outline of later-described first and second straight portions 21, 22 and straight portions 29 of the plate-like spring 6.

The through holes 17 are disposed at outer wall of the plurality of outer walls 15 of the housing 5, other than the outer wall formed with the opening portion 16. The through holes 17 are disposed at an outer wall 15c of a plurality of outer walls 15, located at the front in FIG. 1, 2 and at an outer wall 15d located at rear in FIG. 1, 2. The through hole 17 disposed at the outer wall 15c is marked by 17a and the through hole 17 disposed at the outer wall 15d is marked by 17b.

Four through holes 17a and four through holes 17b are respectively disposed at the outer wall 15c and the outer wall 15d. The each through hole 17a, 17b has a round shape in plan view. An inner diameter of through hole 17a disposed at the outer wall 15c is smaller than the outer diameters of the first and second flanges 12, 13. An inner diameter of through hole 17b disposed at the outer wall 15d is the same as the outer diameters of the first and second flanges 12, 13. One opening portion 16 communicates two through holes 17a and two through holes 17b. The each through hole 17a and the each through hole 17b are disposed coaxially to each other.

After the other end 11c of the ferrule 4 is inserted through the through hole 17b into the opening portion 16, the other end 11c of the ferrule 4 is positioned through the through hole 17a at outside of the housing 5. Thereby, the first flange 12 abuts on an inner surface of the outer wall 15c, i.e. an inner surface of the housing 5 so as to be positioned in the housing 5. An area between the central portion 11a and one end 11b of the ferrule 4 is received in the housing 5.

Each center axis P (shown by a long dashed short dashed line in FIG. 1) of respective optical fibers 8 joined with the ferrules 4 received in the housing 5 is disposed in parallel to each other. One pair of ferrules 4 is received in one opening portion 16. The pair of ferrules 4 is disposed along an arrow S shown in FIG. 1.

Thus, the area between the central portion 11a and one end 11b of the ferrule 4 is received in the housing 5. The second flange 13 is supported in the through hole 17b of the housing 5 freely to move along the center axis P of the optical fiber 8 joined with the ferrule 4.

Figure 1:
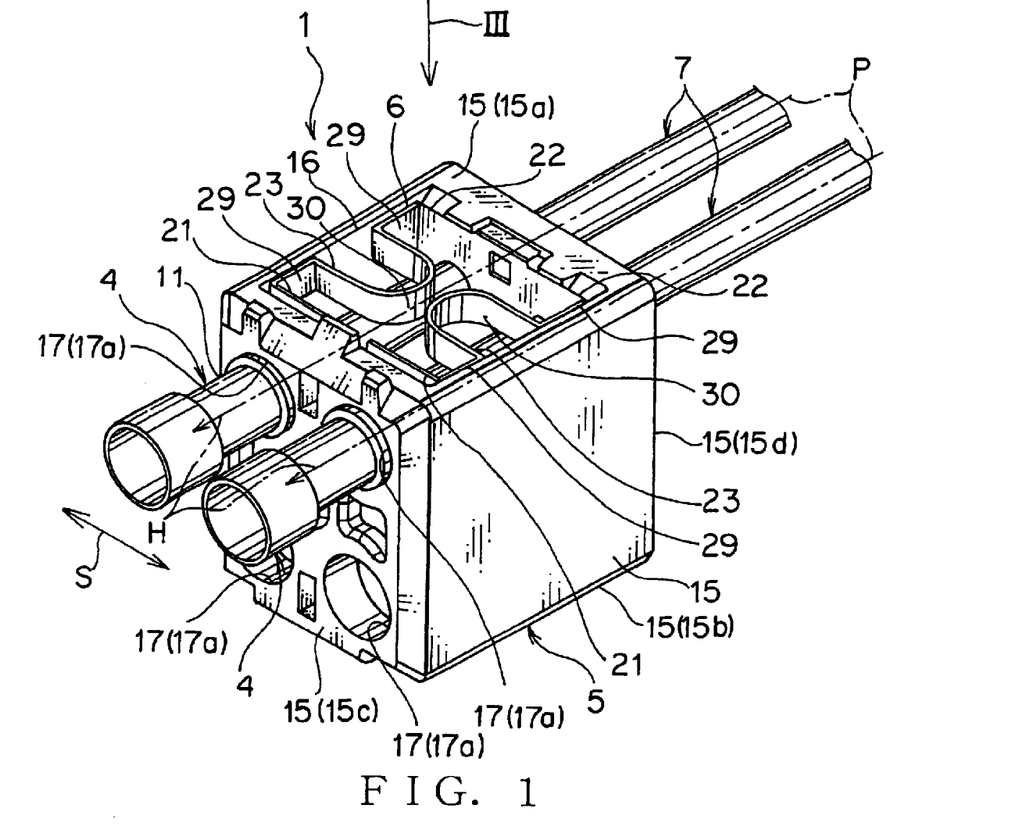
FIG. 1 is a perspective view of one embodiment of an optical connector according to the present invention.
Figure 2:
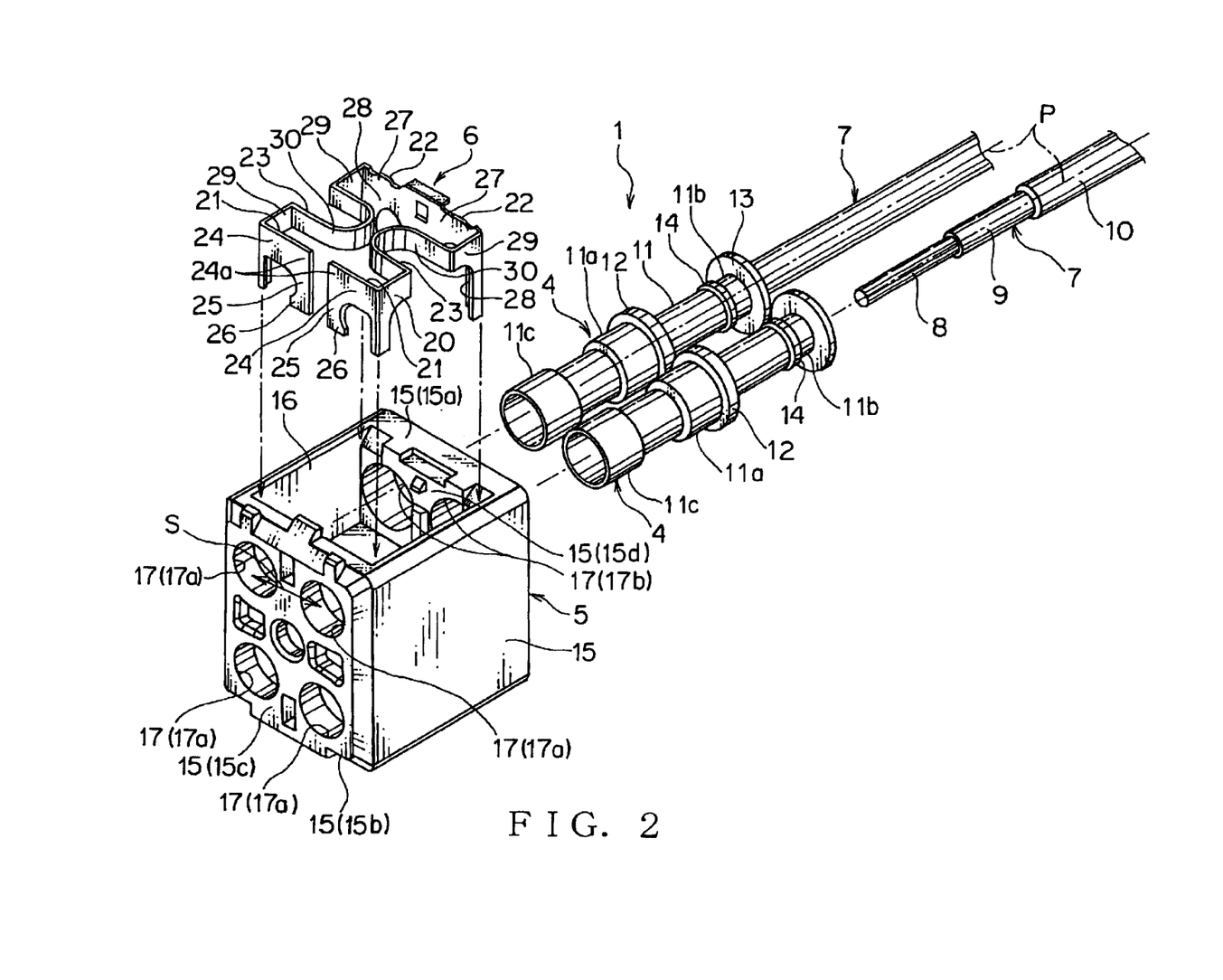
FIG. 2 is an exploded perspective view of the optical connector shown in FIG. 1.
Figure 3:
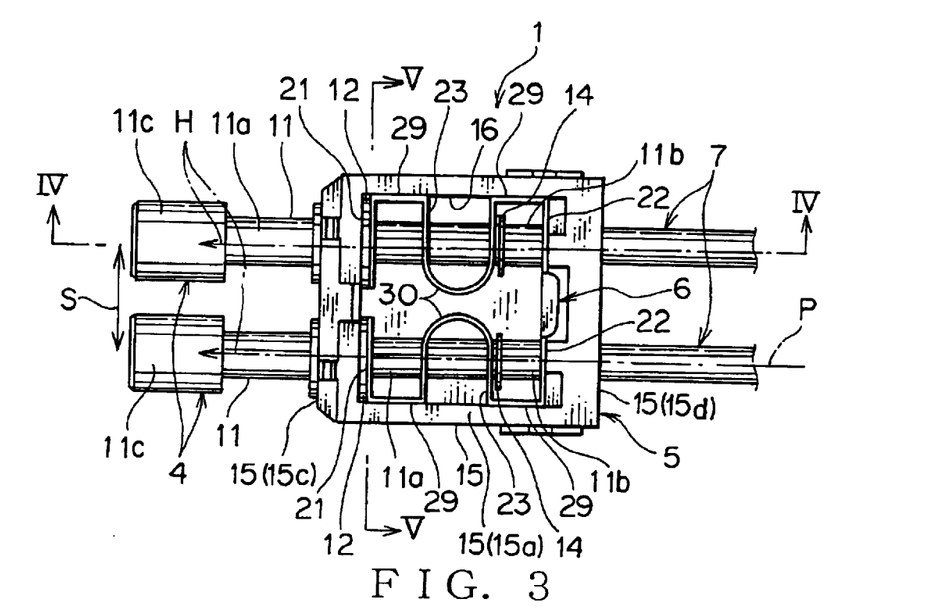
FIG. 3 is a plan view of the optical connector when viewed from an arrow III in FIG. 1.
Figure 4:
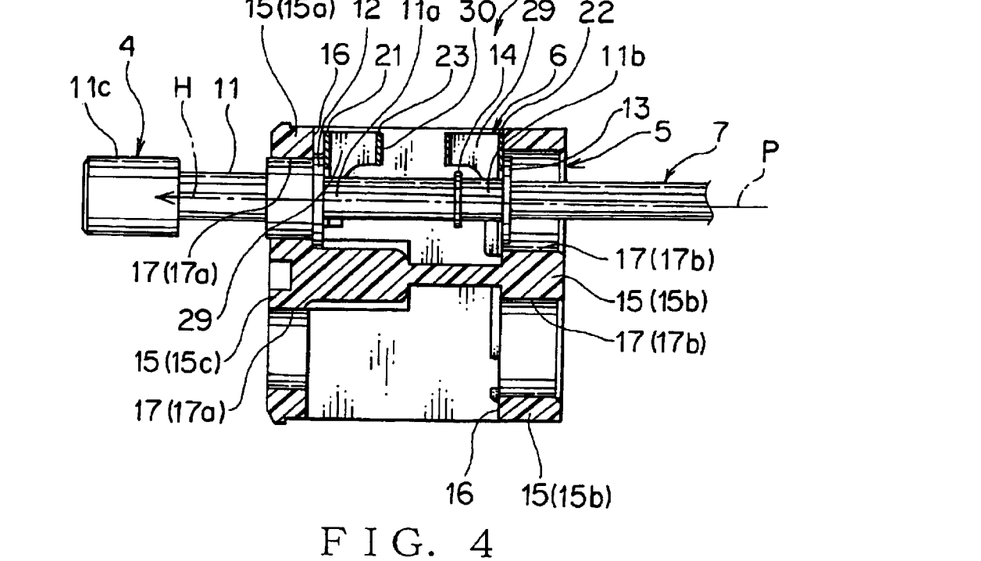
FIG. 4 is a sectional view of the housing taken along the line r IV—IV in FIG. 3.
Figure 5:
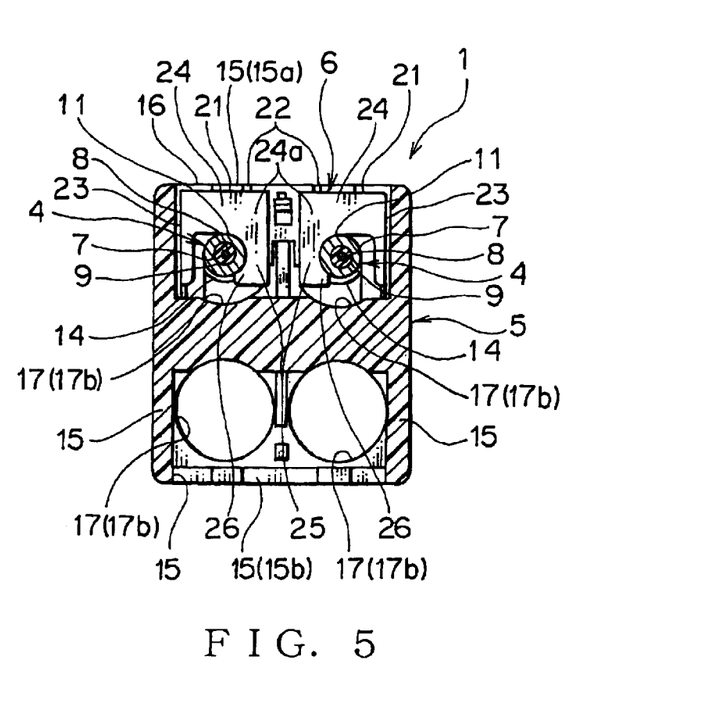
FIG. 5 is a sectional view taken along the line V—V in FIG. 3.
Figure 6:
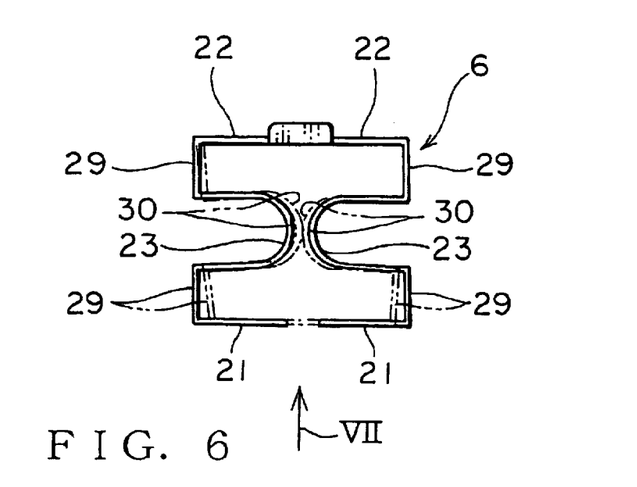
FIG. 6 is a plan view of a plate-like spring of the optical connector shown in FIG. 1.

The plate-like spring 6 is made of a constant-thick sheet metal and formed by bending the sheet metal. The plate sparing 6 is received in the opening portion 16; i.e. the housing 5. The plate-like spring 6, as shown in FIG. 6–8, has a pair of first straight portions 21, a pair of second straight portions 22 and a pair of connecting portions 23.

When the plate-like spring 6 is received in the opening portion 16, the pair of first straight portions 21 is located with a space along the arrow S. The first straight portion 21 is formed plate-like. Both surfaces of the pair of first straight portions 21 are placed on the same planes. When the plate-like spring 6 is received in the opening portion 16, the both surfaces of the pair of first straight portions 21 intersect perpendicularly to the center axis P of the optical fiber 8.

Figure 7:
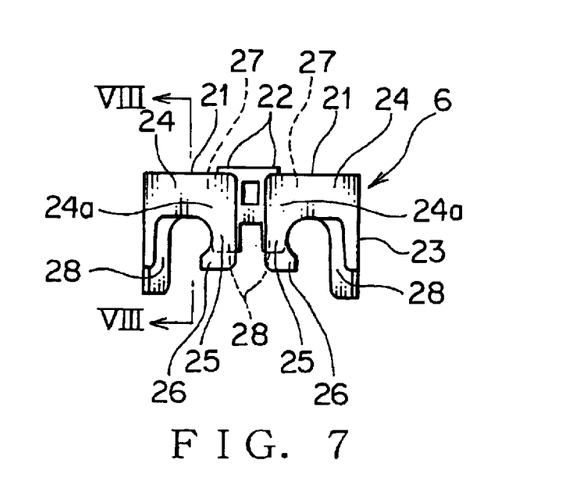
FIG. 7 is a front view of the plate-like spring when viewed from an arrow VII in FIG. 6.
Figure 8:
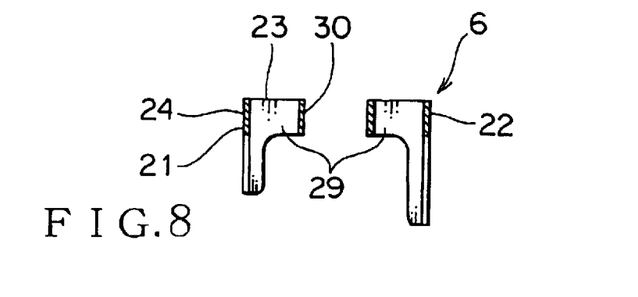
FIG. 8 is a sectional view taken along the line VIII—VIII in FIG. 7.

The first straight portion 21, as shown in FIG. 7, has a plate-like body portion 24, a first extending portion 25 and the second extending portion 26. The body portion 24 is formed rectangular in plan view. When the plate-like spring 6 is received in the opening portion 16, lengthwise of the body portion 24 is parallel to the arrow S. The first extending portion 25 extends from the body portion 24 in a direction perpendicular to the lengthwise of the body portion 24. The first extending portions 25 extend from each end 24a opposing to each other of the body portions 24 of the pair of first straight portions 21. The end 24a is defined as an inside end of the body portion 24.

The second extending portions 26 extend from each top end at a far side from the body portion 24 of the first extending portions 25 to be apart from each other. A direction in which the second extending portion 26 extends from the first extending portion 25 intersects perpendicularly a direction in which the first extending portion 25 extends from the body portion 24. The direction in which the second extending portion 26 extends from the first extending portion 25 is parallel to the arrow S when the plate-like spring 6 is received in the opening portion 16.

An inner edge by the body portion 24, the first extending portion 25 and the second extending portion 26 is formed along an outline of the cylindrical portion 11 of the ferrule 4. The first straight portion 21 locks the ferrule 4 by positioning (surrounding) the ferrule 4 in the body portion 24, the first extending portion 25 and the second extending portion 26. The aforesaid first straight portion 21 corresponds to the lock portion in this specification.

The pair of second straight portions 22 is disposed along the arrow S when the plate-like spring 6 is received in the opening portion 16. The second straight portion 22 is formed plate-like. Both surfaces of the pair of second straight portions 22 are placed on the same plane. The second straight portions 22 are continuous to each other. The both surfaces of the second straight portions 22 are parallel to the both surfaces of the first straight portions 21. Thereby, when the plate-like spring 6 is received in the opening portion 16, the both surfaces of the pair of second straight portion 22 intersect perpendicularly to the center axis P of the optical fiber 8.

The second straight portion 22, as shown in FIG. 7, has a plate-like second body portion 27 and a pair of extending portions 28. The second body portion 27 is formed rectangular in plan view. When the plate-like spring 6 is received in the opening portion 6, the lengthwise of the second body portion 27 is parallel to the arrow S. The pair of extending portions 28 extend in parallel to each other from both ends of lengthwise of the second body portion 27. A direction in which the extending portion 28 extends from the second body portion 27 is parallel to a direction in which the first extending portion 25 extends from the body portion 24. The direction in which the extending portion 28 extends from the second body portion 27 intersects perpendicularly with the lengthwise of the second body portion 27.

An inner edge by the second body portion 27 and the pair of extending portions 28 of the second straight portion 22 is formed along an outline of the cylindrical portion 11 of the ferrule 4. The second straight portion 22 positions (surrounds) the ferrule 4 at inside of the second body portion 27 and the pair of extending portions 28.

The pair of connecting portions 23 is disposed with a space along the arrow S when the plate-like spring 6 is received in the opening portion 16. The connecting portion 23 is formed band-like. Each connecting portion 23 is provided integrally with a pair of straight portions 29 and one curved portion 30.

The straight portion 29 is formed rectangular. Lengthwise of the straight portion 29 is parallel to the center axis P of the optical fiber 8 when the plate-like spring 6 is received in the opening portion 16. Both surfaces of the pair of straight portions 29 are placed on the same plane. One of the pair of straight portions 29 is continuous to the first straight portion 21, and the other is continuous to the second straight portion 22. Thus, end of lengthwise of the straight portion 29 is continuous to one of the first straight portion 21 and the second straight portion 22 so as to intersect perpendicularly the both straight portions 21, 22.

The curved portion 30 is formed band-like. Each end of the curved portion 30 is continuous to respective straight portions 29. The curved portions 30 are curved to bring the pair of connecting portions 23 close to each other from the straight portions 29. In other words, the curved portions 30 are curved from the straight portions 29 toward inside of the housing 5.

The curved portion 30 is formed into U-shape in plan view. The curved portion 30 is elastically deformable to allow the first straight portion 21 and the second straight portion 22 to move close to and apart from each other. Thereby, the connecting portion 23 is elastically deformable to allow the first straight portion 21 and the second straight portion 22 to move close to and apart from each other. The connecting portion 23 connects the first straight portion 21 and the second straight portion 22.

The pair of second straight portions 22 and the pair of connecting portions 23 mentioned above correspond to the second connecting portion in this specification. The pair of second straight portions 22 and the pair of connecting portions 23 are elastically deformable. The pair of second straight portions 22 and the pair of connecting portions 23 allow the first straight portions 21 to move close to and apart from each other along the arrow S.

Thereby, the first straight portions 21 can move freely from a position shown by a continuous line in FIG. 6 to a position shown by a long dashed double-short dashed line in FIG. 6. Thus, the pair of second straight portions 22 and the pair of connecting portions 23 are elastically deformable to allow the first straight portions 21 to move close to and apart from each other.

When the aforesaid optical connector 1 is assembled, the ferrule 4 is firstly joined with the end of the optical fiber 8, i.e. the optical fiber cable 7. The other end 11c of the ferrule 4 is inserted in order into the through hole 17b and the through hole 17a. Thereby, the area between the central portion 11a and the one end 11b of the ferrule 4 is received in the opening portion 16, i.e. the housing 5. The first flange 12 is also received in the opening portion 16, i.e. the housing 5.

Figure 11:
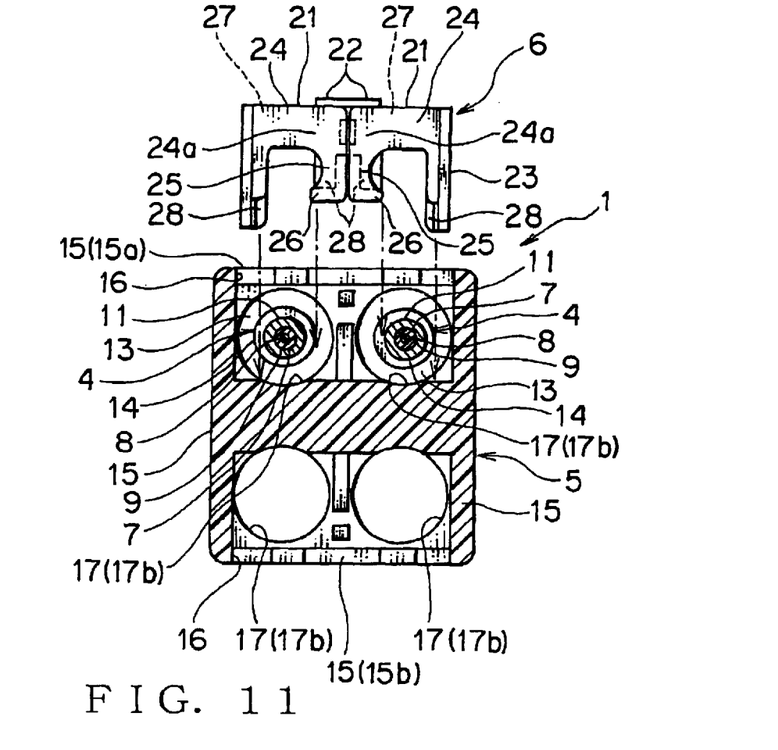
FIG. 11 is a sectional view, showing a condition of moving the first straight portions of the plate-like spring of the optical connector in FIG. 2 close to each other.

While the first flange 12 is abutted on the outer wall 15c, the plate-like spring 6 is deformed elastically so as to move the pair of the first straight portions 21 close to each other, as shown in FIG. 11. Thereafter, the plate-like spring 6 is pressed from top ends of the extending portions 25, 26, 28 into the opening portion 16, i.e. the housing 5. The first and second straight portions 21, 22 and straight portions 29 abut on the inner surface of the opening portion 16, i.e. the inner surface of the housing 5, and the plate-like spring 6 is guided to a inserting direction into the opening portion 16.

Figure 12:
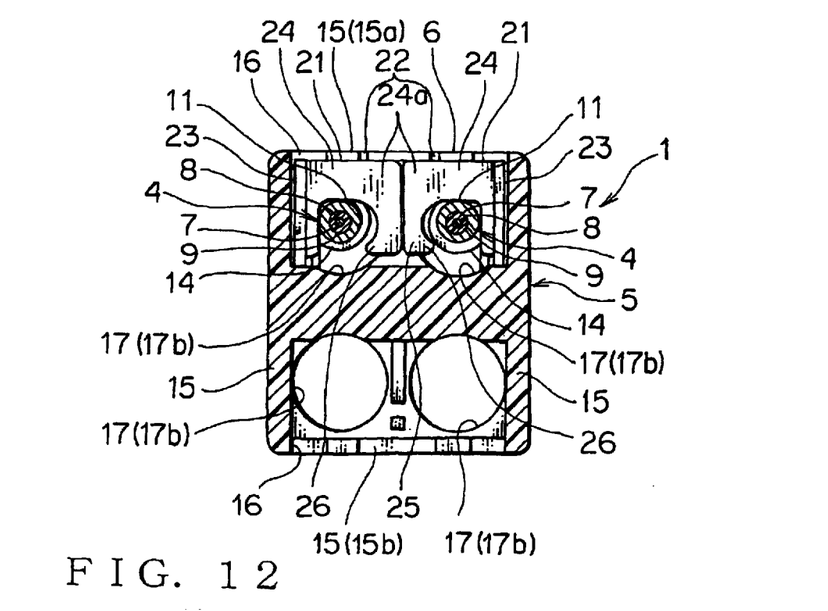
FIG. 12 is a sectional view, showing a condition of inserting the plate-like spring shown in FIG. 11 into the housing.

The plate-like spring 6 is received in the opening portion 16, i.e. the housing 5, as shown in FIG. 12. At the time, the first straight portion 21 is located close to the optical fiber cable 7 behind the first flanges 12. In other words, the first straight portion 21 of the plate-like spring 6 is located at more inner side of the housing 5 than the first flange 12. The first straight portion 21 abuts on the first flange 12. The both surfaces of the first straight portions 21 intersect perpendicularly the center axis P of the optical fiber 8.

The second straight portion 22 is located farther from the optical fiber cable 7 than the second flange 13. In other words, the second straight portion 22 is located at more inner side of the housing 5 than the second flange 13. The second straight portion 22 abuts on the inner surface of the outer wall 15d, i.e. the inner surface of the housing 5. The both surfaces of the second straight portions 22 intersect perpendicularly the center axis P of the optical fiber 8.

When, pushing the first straight portions 21 to be close to each other is stopped, the first straight portions 21 is moved apart from each other by elastic restoring force of the second straight portions 22 and the connecting portion 23, i.e. the plate-like spring 6. Thereby, the cylindrical portion 11 of the ferrule 4 is surrounded with the body portion 24, the first extending portion 25 and the second extending portion 26. And, the first straight portion 21 locks the cylindrical portion 11 of the ferrule 4. Thus, the optical connector 1 is assembled.

After the first straight portion 21 locks the ferrule 4, the connecting portion 23, i.e. the plate-like spring 6 abutting on the ferrule 4 pushes the ferrule 4 along an arrow H (shown in FIG. 1) parallel to the center axis P by elastic restoring force.

Thus, the first straight portion 21 abuts on the first flange 12 of the ferrule 4 and the surface of the first straight portion 21 intersects perpendicularly the center axis P. The second straight portion 22 abuts on the inner surface of the housing 5 and the surface of the second straight portion 22 intersects perpendicularly the center axis P. In above condition, the plate-like spring 6 received in the housing 5 pushes the ferrule 4 along the center axis P. When the ferrules 4 are locked with the pair of the first straight portions 21, the ferrules 4 are maintained to be surrounded by the body portion 24, the first extending portion 25 and the second extending portion 26.

Figure 9:
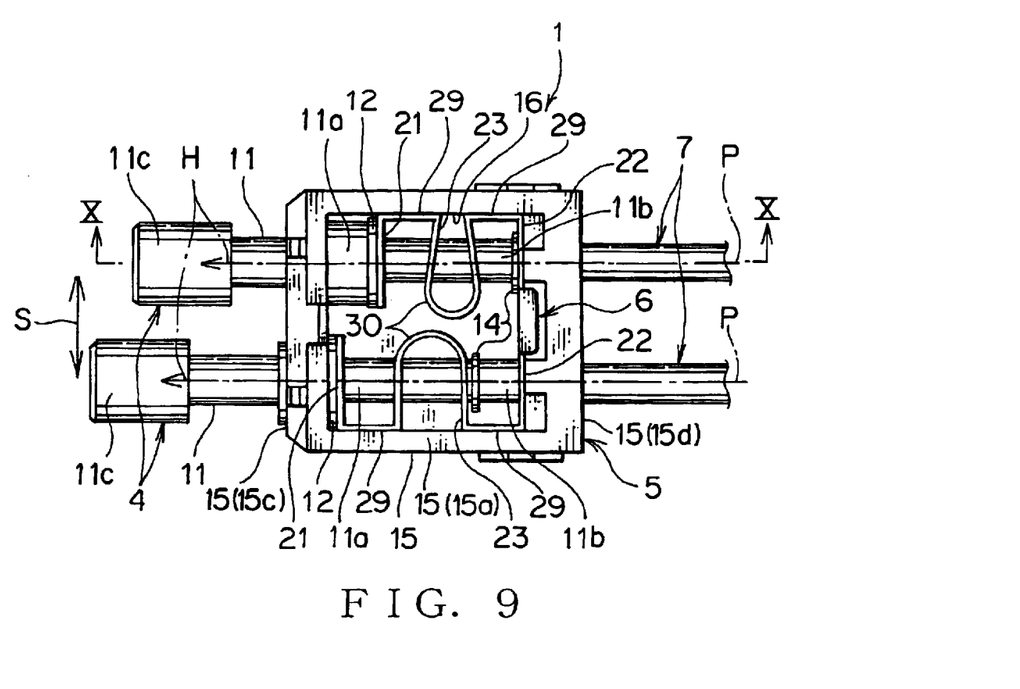
FIG. 9 is a plan view, showing a condition of pulling an optical fiber of the optical connector shown in FIG. 3.
Figure 10:
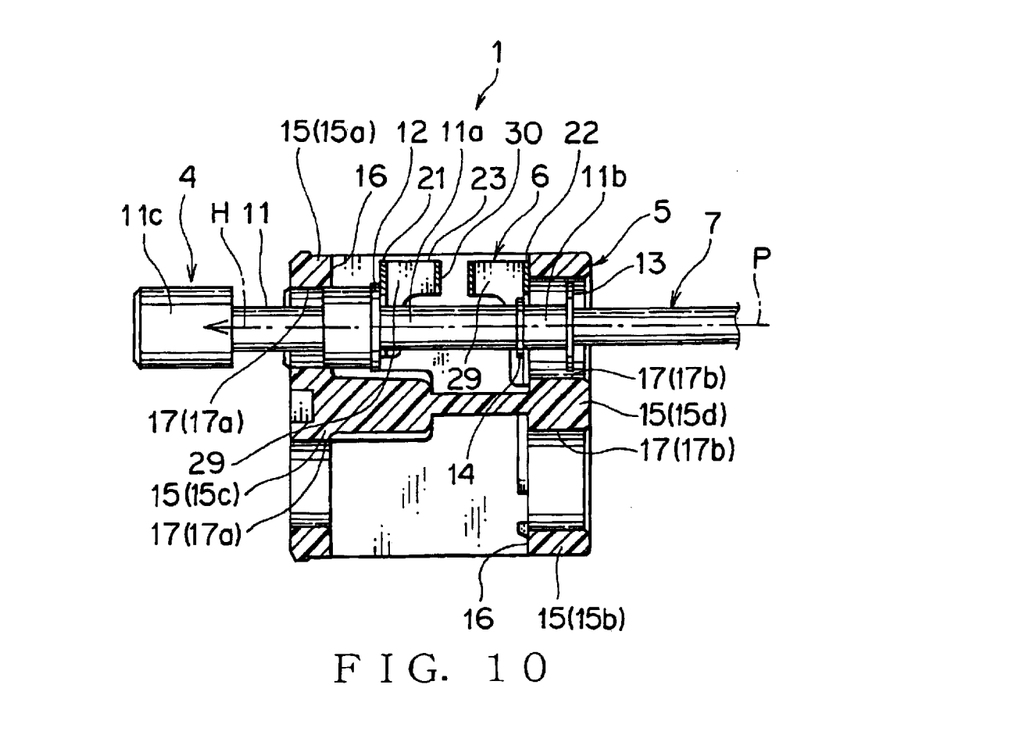
FIG. 10 is a sectional view of the housing taken along the line X—X in FIG. 9.

When the optical fiber cable 7 is pulled against the pushing force of the connecting portion 23 of the plate-like spring 6 in the optical connector 1 assembled as mentioned above, the first and second straight portions 21, 22 are moved close to each other to deform elastically the plate-like spring 6 as shown in FIG. 9, 10. At the time, the surfaces of the first and second straight portions 21, 22 are maintained to intersect perpendicularly the center axis P. The third flange 14 abuts on the inner surface of the outer wall 15d to prevent deforming the plate-like spring 6 over limit of elasticity.

According to this embodiment, the surface of the first straight portion 21 abutting on the first flange 12 of the ferrule 4 and the surface of the second straight portion 22 abutting on the inner surface of the housing 5 intersect perpendicularly the center axis P. Therefore, when the optical fiber cable 7 is pulled along the center axis P of the optical fiber 8 against the pushing force of the plate-like spring 6, the ferrule 4 may be not tilted. Therefore, reduction of transmitting efficiency of the signal light can be prevented.

When the first straight portion 21 locks the ferrule 4, the ferrule 4 is surrounded with the body portion 24, the first extending portion 25 and the second extending portion 26. The direction of the first extending portion 25 extending intersects perpendicularly the direction of the second extending portion 26 extending. When the pair of first straight portions 21 is locked with the ferrule 4, the ferrule 4 is maintained to be surrounded with the body portion 24, the first extending portion 25 and the second extending portion 26 by the elastic restoring force of the connecting portion 23. Thereby, the plate-like spring 6 is prevented from unexpected slipping out of the housing 5.

After the plate-like spring 6 is inserted into the opening portion 16 while the pair of first straight portions 21 is moved close to each other, the pair of first straight portions 21 is locked with the ferrule 4 by the elastic restoring force of the second straight portion 22 and the connecting portion 23. Thus, the plate-like spring 6 can be mounted in the housing 5 by inserting the plate-like spring 6 into the opening portion 16 while the plate-like spring 6 is deformed to move the pair of first straight portions 21 close to each other. Therefore, the plate-like spring 6 can be mounted easily in the housing 5.

The opening portion 16 is formed rectangularly along the first and second straight portions 21, 22 and the pair of straight portions 29 of the connecting portions 23. Thereby, when the plate-like spring 6 is inserted into the opening portion 6, the first and second straight portions 21, 22 and the pair of straight portions 29 of the connecting portions 23 abut on the inner surface of the housing 5, and the plate-like spring 6 is guided in a direction of inserting. Thus, the plate-like spring 6 can be mounted more easily in the housing 5. The third flange 14 abuts on the outer wall 15d so as to prevent deforming the plate-like spring 6 over limit of elasticity. Therefore, the plate-like spring 6 can push the ferrule 4 securely.

In the above embodiment, the area between the central portion 11c and the one end 11b of the ferrule 4 is received in the opening portion 16, i.e. the housing 5. According to this invention, whole area of the ferrule 4 may be received in the housing 5, or a part of the ferrule 4 may be received in the housing 5. In the aforesaid embodiment, a pair of the ferrules 4 is provided. Four ferrules 4 may be provided, and a plurality of the ferrules 4 can be provided in this invention.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

What is claimed is:

1. An optical connector having a ferrule to be attached to an end of an optical fiber, a housing formed into a box-shape for receiving at least a part of said ferrule, and a plate-like spring received in said housing and pushing said ferrule along a center axis of said optical fiber, said ferrule comprising:
a cylindrical portion for receiving said optical fiber; and
a projecting portion projecting from an outer surface of said cylindrical portion, said projecting portion being positioned in said housing and supported freely to move along the center axis of said optical fiber by said housing, said plate-like spring comprising:
a first flat straight portion;
a second flat straight portion parallel to the first straight portion; and
a connecting portion connecting the first straight portion and the second straight portion and being elastically deformable so as to allow the first straight portion and the second straight portion to move close to and apart from each other,
whereby the first flat straight portion abuts on the projecting portion of the ferrule and the second flat straight portion abuts on an inner surface of the housing, and whereby the plate-like spring is received in the housing so as to place a surface of the first flat straight portion and a surface of the second flat straight portion perpendicular to the center axis and pushes the ferrule along the center axis.

2. An optical connector, having a ferrule to be attached to an end of an optical fiber, a housing formed into a box-shape with an opening portion for receiving at least a part of said ferrule, and a plate-like spring received in said opening portion and pushing said ferrule along a center axis of said optical fiber, comprising a pair of ferrules, said plate-like spring comprising:
a pair of locking portions locking respectively each of said pair of ferrules; and
a connecting portion connecting each of said pair of locking portions and being elastically deformable so as to allow the pair of locking portions to move close to and apart from each other,
said each locking portion comprising:
a body portion abutting on said ferrule for pushing said ferrule;
a first extending portion extending from an inside edge of said body portion of one of said pair of locking portions being parallel to a first extending portion of an other of said pair locking portions; and
a second extending portion extending from each first extending portion in a direction perpendicular to the first extending portion, said locking portions locking said ferrule so as to position said ferrule in said body portion, the first extending portion and the second extending portion,
whereby the plate-like spring is inserted into the opening portion to elastically deform the connecting portion in a direction of bringing said pair of locking portions near to each other such that at least a part of the ferrule is received in the opening portion, and each of said locking portions locks a respective said ferrule such that the locking portions are separated from each other by elastic restoring force of the connecting portion.

3. The optical connector according to claim 1, comprising a pair of said ferrules,
whereby said housing has an opening portion for receiving at least a part of said ferrule, said opening portion receiving said plate-like spring therein, whereby a pair of the first flat straight portions, a pair of the second flat straight portions and a pair of connecting portions are provided,
each one of the first flat straight portions comprising;
a body portion abutting on said ferrule for pushing said ferrule;
a first extending portion extending from an inside edge of said body portion of one of said first flat straight portions being parallel to a first extending portion of an other of said body portions; and
a second extending portion extending from each of the first extending portions in a direction perpendicular to the first extending portion, said first extending portion locking said ferrule so as to position said ferrule in said body portion, the first extending portion and the second extending portion,
said pair of second flat straight portions being connected with each other to be elastically deformable so as to allow said pair of first flat straight portions to move close to and apart from each other,
whereby the plate-like spring is inserted into the opening portion to elastically deform the pair of connecting portions in a direction of bringing said pair of first flat straight portions near to each other such that at least a part of the ferrule is received in the opening portion, and said first flat straight portions lock said ferrules with the pair of first flat straight portions separated from each other by an elastic restoring force of the connecting portion.

4. The optical connector according to claim 3, wherein each said connecting portion is connected with one of said first flat straight portions and said second flat straight portions and provided with a pair of straight portions along a direction perpendicular to the first and second flat straight portions, wherein said opening portion is formed into a rectangular outline of said first flat straight portion, said second flat straight portion and said straight portion.

* * * * *